(12) United States Patent
Yang

(10) Patent No.: US 7,151,358 B1
(45) Date of Patent: Dec. 19, 2006

(54) MULTI-BATTERY AUTOMATIC CHARGING CIRCUIT WITH INDIVIDUAL REGULATOR

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 163 days.

(21) Appl. No.: 10/390,034

(22) Filed: Mar. 18, 2003

(51) Int. Cl.
   *H02J 7/00* (2006.01)

(52) U.S. Cl. .................. 320/119; 320/160
(58) Field of Classification Search .......... 320/119, 320/160, 116, 117, 120, 121, 122, 124, 127, 320/128, 140, 139
   See application file for complete search history.

(56) References Cited

U.S. PATENT DOCUMENTS 6,097,174 A    8/2000  Yang et al. ............. 320/119

2003/0038612 A1 *  2/2003  Kutkut ................. 320/140

\* cited by examiner

*Primary Examiner*—Donald Sparks
*Assistant Examiner*—Lawrence Luk
(74) *Attorney, Agent, or Firm*—Rabin & Berdo, P.C.

(57) ABSTRACT

A multi-battery automatic charging circuit with individual regulator is further provided with one secondary or more than one output interface to convert an AC source via a rectifier into a DC charging source, thus to supply power to an external rechargeable device or a DC load of different voltage through a tap of the circuit specific voltage; or alternatively, a primary battery, or a rechargeable battery provided with storage capacity, or any other rechargeable device generally available in the market is placed in the battery holder provided otherwise for the placement of rechargeable batteries to charge the external rechargeable device or to supply power to a DC load.

9 Claims, 1 Drawing Sheet

US 7,151,358 B1

MULTI-BATTERY AUTOMATIC CHARGING CIRCUIT WITH INDIVIDUAL REGULATOR

BACKGROUND OF THE INVENTION (a) Field of the Invention

The present invention is related to an improvement of a Individually Adjustable Type Automatic Charging Circuit For Multiple Batteries disclosed in U.S. patent application Ser. No. 09/156,618 (U.S. Pat. No. 6,097,174) by further providing one secondary or more than one output interface to convert an AC source via a rectifier into a DC charging source, thus to supply power to an external rechargeable device or a DC load of different voltage through a tap of the circuit specific voltage; or alternatively, a primary battery, or a rechargeable battery provided with storage capacity, or any other rechargeable device generally available in the market is placed in the battery holder provided otherwise for the placement of rechargeable batteries to charge the external rechargeable device or to supply power to a DC load.

(b) Description of the Prior Art

The conventional charger can only charge one type of rechargeable battery alone. When two or more than two batteries of difference end voltages due to different residual capacity are charged in parallel not at the same time, the battery placed in the charger at a later time will be charged first, and the one placed earlier and having been charged for a certain time will be delayed in charging due to the voltage difference.

SUMMARY OF THE INVENTION

The primary purpose of the present invention is to provide one secondary or more than one output interface to convert AC source via a rectifier into DC charging source, thus to supply power to an external rechargeable device or a DC load of different voltage through a tap of the circuit specific voltage; or alternatively, a primary battery, or a rechargeable battery provided with storage capacity, or any other rechargeable device generally available in the market is placed in the battery holder provided otherwise for the placement of rechargeable batteries to charge the external rechargeable device or to supply power to a DC load.

DETAILED DESCRIPTION OF THE PREFERRED EMBODIMENTS

Figure 1:
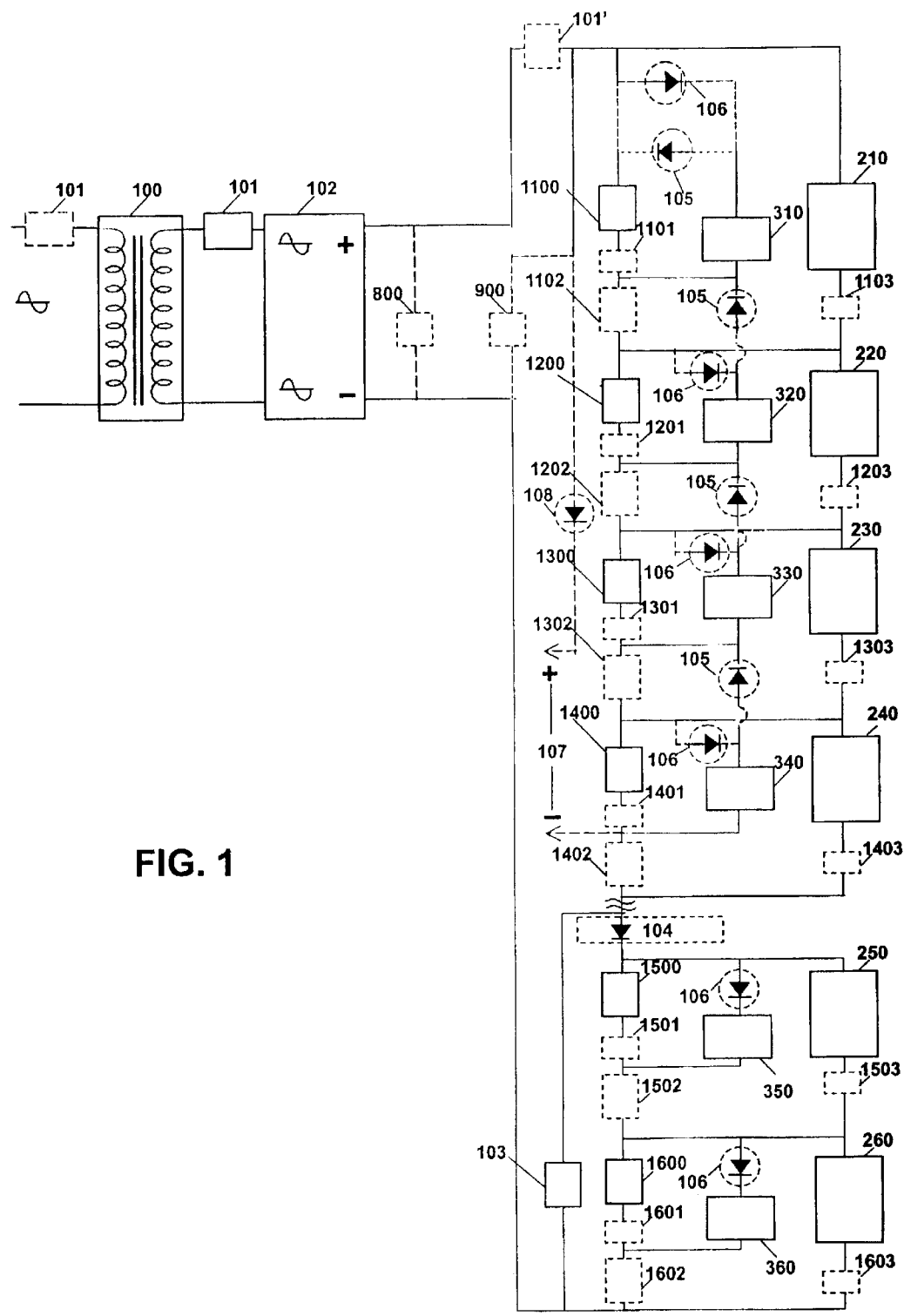
FIG. 1 is a schematic view showing a serial circuit of the present invention.

A multi-battery automatic charging circuit with individual regulator of the present invention as illustrated in FIG. 1 is related to a DC source or one that is controlled by a regulator, or one that is converted from AC of the prior art, comprised of:

an AC transformer 100: with its primary side provided for AC input and the secondary side for AC output; and the AC transformer 100 is provided as an optional as required by the circuit while an input AC source may be forthwith used;

an AC limit resistance 101: a capacitor or an inductive resistance to prevent shortage on the load side, or a hybrid AC limit resistance comprised of those two types or more than two types including the capacitor resistance and inductive resistance, to be connected in series on the AC source side of the transformer or between the AC source and a rectifier 102 in the absence of a limit resistance at the terminal of the DC source;

a filter capacitor 800: related to an optional device, comprised of a conventional capacitor;

a DC limit resistance 101': related to an optional device; when the source relates to a DC source, or that converted from AC via the rectifier 102 and the filter capacitor 800, and the AC limit resistance 101 is not provided in series on the AC side, a DC limit resistance comprised of a resistance, or an active transistor and a drive circuit is connected in series between the DC source and the load side, or the a conventional regulator circuit or regulator IC is provided before the output.

The multi-battery automatic charging circuit with individual regulator of the present invention includes:

a Zener regulator 900: comprised of a Zener diode or any other regulator electronic circuit, and connected in parallel to both sides of the individual regulator series circuit;

an individual regulator circuit in series includes:

a divider regulator 1100, 1200, 1300, 1400, 1500, 1600: comprised of a positive going diode or a Zener diode connected in series; two or more than two units of a charging connector or battery holder being provided to match two or more than two storage units, and allowing individual or simultaneous placement of batteries to be charged or removed as desired; and a primary bias resistances 1110, 1201, 1301, 1401, 1501, 1601: to be provided as optional depending on the charging voltage required; comprised of a resistance to be connected in series with the corresponding divider regulator 1100, 1200, 1300, 1400, 1500, 1600 in series in the sequence of 1100, 1101, 1200, 1201, 1300, 1301 . . . 1600, 1601 to form a graded divider circuit; wherein, 1100 and 1101 being connected in series to become a first individual regulator unit; 1200 and 1201, the second; 1300 and 1301, the third; 1400 and 1401, the fourth; 1500 and 1501, the fifth; and 1600 and 1601, the sixth individual regulator unit with all the six individual regulator units connected in series while both ends of each individual regulator unit are connected to the storage unit comprised of a battery, charging connector, or the battery holder to provide charging voltage;

an HV output tap 107: related to the higher charging voltage outputted from both ends of each of two or more than two of those dividers regulator 1100, 1200, 1300, 1400, 1500, 1600, and a diode 108 may be connected in series to the output end to prevent inverse discharging when required;

a negative going output diode 105: provided between each storage unit and the output end of the HV output tap 107, connected in series to the positive-going series output polarity of the storage unit comprised of a battery, charging connector or battery holder in the positive direction of the output current, so to execute external power output from the battery in the storage unit;

a diverter resistance 103: to be connected in parallel with both ends of the individual regulator circuit when the charging current supplied by each charging connector must be of different rated amperage, so to relatively allot the amperage respectively outputted to the diverter resistance 103 and the individual regulator circuit connected in parallel with the diverter resistance 103; to further prevent inverse discharging by the storage unit via the diverter resistance 103, the positive polarity of a diode 104 is first connected in series with the individual regulator circuit to be connected in parallel with the diverter resistance while another end of the diode 104 is connected in parallel with the diverter resistance 103; and the diverter resistance 103 is provided as an optional depending on the functional requirements.

The multi-battery automatic charging circuit with individual regulator comprised of those circuit devices as described above maybe forthwith comprised of any Pb, NiH, NiZn, NiFe, Li battery or any other device with storage and discharging capacity, or comprised of multiple storage units 310, 320, 330, 340, 350, 360 formed by multiple charging connectors or battery holders matching those batteries described above.

Depending on the following optional functions, additional devices maybe provided to the multi-battery automatic charging circuit with individual regulator including:

a diode 106, 108 to prevent inverse discharging: to be connected in series to each storage unit depending on the direction of the charging current of each of those storage units 310, 320, 330, 340, 350, 360 to prevent inverse discharging; and may be or may not be provided depending on the requirements of the circuit;

multiple light emit display circuits 210, 220, 230, 240, 250, 260: each comprised of an LED or bulb that converts electric energy into optical energy as may be required respectively by multiple matching limit resistances 1103, 1203, 1303, 1403, 1503, 1603 connected in series.

In the individual regulator circuit described above that may be provided with an optional light emit display circuit to display the charging status of the storage unit, the light emit display circuit displays at a lux in relation to the changed terminal voltage in the storage unit; wherein, the light emit display circuits 210, 220, 230, 240, 250, 260 are connected to the individual regulator circuit as follows:

(1) to be directly connected in parallel with the battery or the charging connector or the battery holder of the storage unit; or (2) alternatively, an additional secondary bias resistances, 1102, 1202, 1302, 1402, 1502, 1602 is connected in series to each individual regulator circuit to regulate the drive bias set for the respectively light emit display circuits 210~260 as required.

Those primary bias resistances 1101, 1201, 1301, 1401, 1501 and 1601, secondary bias resistances 1102, 1202, 1302, 1402, 1502 and 1602, limit resistances 1103, 1203, 1303, 1403, 1503 and 1603 and diverter resistance 103 may be as applicable comprised of conventional resistances, or that provided with positive temperature coefficient (PTC) or negative temperature coefficient (NTC).

Furthermore, those individual regulators connected in series may be made into a circuit connected in series and parallel including two or more than two sets each comprised of an individual regulator and a storage unit, or charging connector or battery holder connected in series.

The successful development of various types of portable electric appliances in recent years, the demand of disposal consumer battery is on the increase. However, the disposal battery is expensive and a source of environmental pollution. The multi-battery automatic charging circuit with individual regulator of the present invention is designed with two or more than two charging connectors or battery holders to charge one battery or multiple batteries of different residual capacity with the individual regulator allowing individual battery to be charged or removed as desired like a cafeteria to serve customers of different needs at different time, thus to make charging batteries even more convenient. Therefore, this application for a utility patent is duly filed accordingly.

What is claimed is:

1. A circuit for charging batteries, comprising:
   a DC power source having first and second terminals, the power source being operable to maintain a potential difference between the terminals; the first terminal being a positive terminal;
   divider means, connected between the first and second power source terminals, for dividing the potential difference into a plurality of smaller potential differences that are applied to the batteries to charge the batteries when the power source is operating;
   a plurality of diodes that are connected to the batteries in an alternating series, such that diodes alternate with the batteries in the series, the alternating series of diodes and batteries being connected between the first power source terminal and a connection point on the divider means that is remote from the first power source terminal, the anodes of the diodes in the alternating series being oriented toward the first power source terminal so as to permit a flow of current through the alternating series in a direction toward the first power source terminal;
   first and second voltage output tap terminals; means for connecting the first voltage output tap terminal to the first power source terminal; and
   means for connecting the second voltage output tap terminal to the connection point on the divider means.

2. The circuit of claim 1, wherein the divider means has a first portion and a second portion, the first portion being connected to the first power source terminal and the second portion being connected to the second power source terminal, the first and second portions of the divider means being connected to one another at said connection point on the divider means.

3. The circuit of claim 2, further comprising a diverter resistance connected between the second power source terminal and said connection point on the divider means.

4. The circuit of claim 3, wherein the batteries are first batteries, and wherein second batteries are charged by the second portion of the divider means.

5. The circuit of claim 1, further comprising a plurality of light emitting displays that are connected to the divider means.

6. The circuit of claim 1, further comprising a plurality of further diodes that are connected to the divider means, said smaller potential differences being applied to the batteries via the further diodes.

7. The circuit of claim 1, wherein the power source comprises a transformer, a rectifier to rectify electricity from the transformer, a filter capacitor to smooth the rectified electricity, and a voltage regulator to regulate the potential differences maintained between the first and second power source terminals.

8. The circuit of claim 7, wherein the power source further comprises an impedance to limit the current supplied by the power source, said impedance including a capacitive or an inductive element or a resistance, or a hybrid AC limit impedance comprised of two or more than two types of said impedances.

9. The circuit of claim 1, wherein the divider means comprises a series that includes a plurality of divider regulators and a plurality of bias resistances.

* * * * *